United States Patent
Jang et al.

(10) Patent No.: US 9,963,039 B1
(45) Date of Patent: May 8, 2018

(54) METHOD AND SYSTEM FOR CONTROLLING LOCK OF CHARGING INLET

(71) Applicants: HYUNDAI MOTOR COMPANY, Seoul (KR); KIA Motors Corporation, Seoul (KR)

(72) Inventors: Young Jin Jang, Pohang-si (KR); Soung Han Noh, Yongin-si (KR); Jun Yeon Park, Incheon (KR); Hyung Souk Kang, Seoul (KR)

(73) Assignees: HYUNDAI MOTOR COMPANY (KR); KIA MOTORS CORPORATION (KR)

( * ) Notice: Subject to any disclaimer, the term of this patent is extended or adjusted under 35 U.S.C. 154(b) by 0 days. days.

(21) Appl. No.: 15/839,222

(22) Filed: Dec. 12, 2017

(30) Foreign Application Priority Data

Oct. 23, 2017 (KR) .................... 10-2017-0137575

(51) Int. Cl.
*B23K 11/24* (2006.01)
*B60L 11/18* (2006.01)
*E05B 83/34* (2014.01)
*E05B 43/00* (2006.01)
*H01R 13/639* (2006.01)

(52) U.S. Cl.
CPC ...... *B60L 11/1818* (2013.01); *B60L 11/1812* (2013.01); *B60L 11/1879* (2013.01); *E05B 43/005* (2013.01); *E05B 83/34* (2013.01); *H01R 13/639* (2013.01); *B60L 2240/80* (2013.01)

(58) Field of Classification Search
CPC .................... B60L 11/1818; H01R 13/639
See application file for complete search history.

(56) References Cited

U.S. PATENT DOCUMENTS

| 5,627,448 A * | 5/1997 | Okada ................. B60L 3/12 |
| | | 320/109 |
| 2016/0001667 A1* | 1/2016 | Masuda .............. B60L 11/14 |
| | | 320/109 |

FOREIGN PATENT DOCUMENTS

KR   10-20150067491   6/2015

* cited by examiner

*Primary Examiner* — Daniel Cavallari
(74) *Attorney, Agent, or Firm* — McDonnell Boehnen Hulbert & Berghoff LLP

(57) ABSTRACT

Disclosed herein is a method for controlling a lock of a charging inlet of a vehicle having a lock device for preventing a charging outlet from being disengaged while the charging outlet is engaged. The method for controlling a lock of a charging inlet of a vehicle includes: receiving, by a vehicle controller, an ignition off request of the vehicle in an operation standby state in which the lock device is set to be operated after a predetermined standby period of time; turning off, by the vehicle controller, a power relay of the vehicle while a power latch is maintained to start an ignition off of the vehicle; and operating, by the vehicle controller, the lock device by supplying power to the lock device by turning on the power relay if the ignition off of the vehicle is completed.

10 Claims, 2 Drawing Sheets

METHOD AND SYSTEM FOR CONTROLLING LOCK OF CHARGING INLET

CROSS REFERENCE TO RELATED APPLICATION

The present application claims priority to Korean Patent Application No. 10-2017-0137575, filed on Oct. 23, 2017, the entire contents of which is incorporated herein by reference.

BACKGROUND OF THE DISCLOSURE

1. Technical Field

The present disclosure relates to a method and a system for controlling a lock of a charging inlet for a vehicle, and more particularly, to a method and system for controlling a lock of a charging inlet of a vehicle having a lock device for preventing a charging outlet from being disengaged from to the charging inlet.

2. Description of the Related Art

An electric vehicle or a plug-in hybrid vehicle has an inlet that is capable of being connected to a charging outlet of a charging facility on the outside of the vehicle to supply power from an external charging facility to a battery of the vehicle.

Generally, if an outlet of an external charging facility is engaged with an inlet of a vehicle for charging the battery of the vehicle, the inlet operates the automatic lock function to prevent the outlet from being disengaged. That is, the inlet of the vehicle is equipped with a lock device, and the controller of the vehicle operates the lock device of the inlet to prevent the outlet from being disengaged when the external outlet is engaged with the inlet of the vehicle or when charging power input from the outlet is detected. In order to unlock the lock device of the inlet, a driver needs to perform an unlock input by operating a separate button or similar device provided in the vehicle.

The purpose of the lock function provided in the inlet is to prevent a situation where the charging outlet is disengaged by another person and the charging power already charged is stolen. This may occur, for example, when a driver is away from the vehicle during the charging of the vehicle, which may require a relatively long time.

In general, the inlet lock function is implemented in such a manner that the lock device is automatically operated if a predetermined time has elapsed after the outlet is engaged or the unlock input of the driver is generated. For example, if it is detected that the inlet and outlet are engaged with each other or the unlock input from the driver is generated, the controller operates the counter and immediately operates the lock device if the outlet is not disengaged after a certain period of time, and completes the lock function. This takes into account the time taken for the driver to disengage the outlet after the outlet engagement or the unlock input is generated.

Conventionally, if the input for turning off the vehicle is generated while waiting for the lock device to be operated after the inlet lock function is started, the process of operating the lock device after the standby time has lapsed to complete the lock function and then a process for turning off the vehicle is performed. Accordingly, conventionally, if the driver inputs starting the process for turning off the vehicle while the inlet lock function is in operation, the vehicle may not be immediately turned off and a time delay occurs so the driver needs to wait until the vehicle is turned off. The standby time can range from a few seconds to a few tens of seconds. However, the driver may view the standby time as too long, rather expecting an immediate response to the operation.

SUMMARY OF THE DISCLOSURE

An aspect of the present disclosure is to provide a method and a system for controlling a lock of a charging inlet that has an automatic lock function. The method and the system for controlling a lock of a charging inlet can solve the problem that occurs when the turning off of a vehicle is delayed until an operation of the automatic lock function is completed. This problem occurs when an input for turning off the vehicle is generated during the operation of the automatic lock function for the charging inlet of the vehicle engaged with a charging outlet of an external charging facility.

According to an exemplary embodiment of the present disclosure, there is provided a method for controlling a lock of a charging inlet of a vehicle having a lock device for preventing a charging outlet from being disengaged while the charging outlet is engaged, including: receiving, by a vehicle controller, an ignition off request of the vehicle to the vehicle controller in an operation standby state in which the lock device is set to be operated after a predetermined standby period of time; turning off, by the vehicle controller, a power relay of the vehicle while a power latch is maintained to start an ignition off of the vehicle; and operating, by the vehicle controller, the lock device by supplying power to the lock device by turning on the power relay if the ignition off of the vehicle is completed.

The lock device may start the operation when the standby period of time lapses immediately after the charging outlet is engaged or immediately after the lock device is released.

In the operation of the lock device, the vehicle controller may determine whether the standby period lapses and operates the lock device if the standby time has lapsed.

In the operation of the lock device, the vehicle controller may selectively turn on the power relay to supply power to the lock device if the ignition off of the vehicle is completed.

The method may further include: after the operation of the lock device, the power relay is again turned off by the vehicle controller.

According to another exemplary embodiment of the present disclosure, there is provided a system for controlling a lock of a charging inlet, including: a charging inlet provided in a vehicle and having a lock device preventing an external charging outlet from being disengaged while the charging outlet is engaged; and a vehicle controller receiving information regarding whether the charging outlet is engaged, a request to unlock the lock device, and an ignition off request of the vehicle, and controlling an operation of a power relay of the vehicle and an operation of the lock device according to the information and the requests received, wherein if an ignition off request of a vehicle in an operation standby state in which the lock device is set to be operated after a predetermined standby period of time is received, the vehicle controller turns off the power relay while a power latch is maintained to start an ignition off of the vehicle and then turns on a power relay if an ignition off of the vehicle is completed with a predetermined period of time to supply power to the lock device to operate the lock device.

DETAILED DESCRIPTION OF THE DISCLOSURE

Hereinafter, a method and a system for controlling a lock of a charging inlet according to various exemplary embodiments of the present disclosure will be described in more detail with reference to the accompanying drawings.

Figure 1:
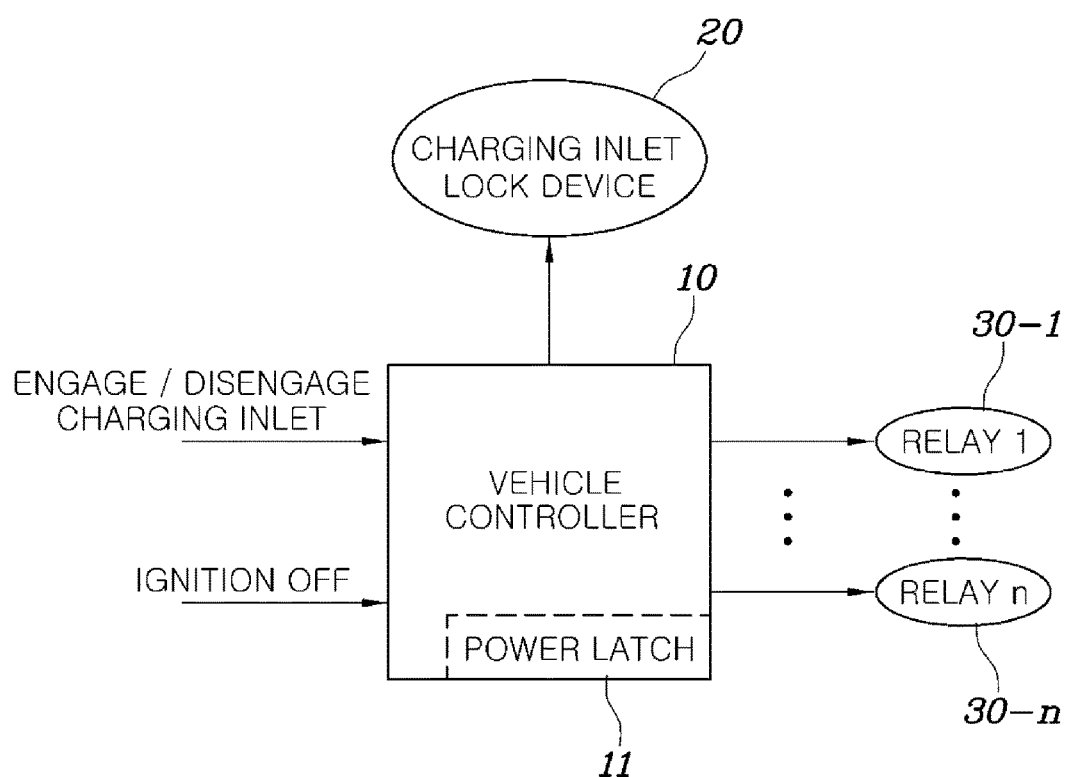
FIG. 1 is a block configuration diagram illustrating a system for controlling a lock of an inlet according to an exemplary embodiment of the present disclosure.

FIG. 1 is a block configuration diagram illustrating a system for controlling a lock of a charging inlet according to an exemplary embodiment of the present disclosure.

Referring to FIG. 1, a system for controlling a lock of a charging inlet according to an exemplary embodiment of the present disclosure may include a vehicle controller 10 and a charging inlet lock device 20.

The vehicle controller 10 may perform an appropriate control by receiving information detecting whether a charging outlet is engaged with or disengaged from a charging inlet from the outside, and a request to stop an operation of the lock device 20, that is, a request to unlock the lock device 20 and a request to turn off the vehicle.

Here, the detection information on whether the charging outlet is engaged with or disengaged from the charging inlet of the vehicle may be generated by a sensor or a similar component provided in the charging inlet of the vehicle. In addition, the request to stop the operation of the lock device 20, the request to turn off the vehicle, or similar requests may be a signal generated by the driver operating a button or a switch provided in the vehicle.

Here, the vehicle controller 10 may be provided with a power latch 11. The power latch 11 refers to an element or function of enabling the operation of the vehicle controller 10 to be maintained for a predetermined time even when the power supplied from the outside to the vehicle controller 10 is cut off. The maintenance of the power latch means that the power is internally maintained so that the vehicle controller can be operated even when the external power is cut off. In the exemplary embodiment of the present disclosure, if the vehicle controller 10 receives the request to turn off the vehicle, the vehicle controller 10 starts the process of turning off the vehicle by turning off power relays 30-1 to 30-n while the power latch is maintained, and then turns on the power relays 30-1 to 30-n again after the turning off process of the vehicle is completed. The turning off process is completed once a predetermined time period passes to supply power to the lock device 20 to operate same.

The charging inlet lock device 20 is a device provided in the inlet (not shown) of the vehicle engaged with the outlet provided in the charging cable of the external charging facility. After the outlet is engaged with the inlet, the charging inlet lock device 20 maintains the engagement of the outlet and the inlet, and prevents the outlet and the inlet from being disengaged from each other, provided there is no request from the driver.

The charging inlet lock device 20 is configured to automatically start the lock operation if the outlet is not disengaged from the inlet for a predetermined time which the lock device is unlocked in response to the lock device unlocking request by the driver while the outside outlet is newly engaged with the inlet or the outlet is engaged with the inlet. The operation may be controlled by the vehicle controller 10. That is, the charging inlet lock device 20 is configured to start the lock operation if the predetermined standby period of time has lapsed. Once the predetermined standby time lapses, the lock device is unlocked in response to the lock device unlocking request by the driver while the outside outlet is newly engaged with the inlet or the outlet is engaged with the inlet.

One exemplary embodiment of the present disclosure relates to the control technique of the vehicle controller 10 when the request to turn off the vehicle is generated during this standby time. Vehicles such as an electric vehicle and a plug-in hybrid vehicle may turn off the power relays 30-1 to 30-n to cut off the power output from the high voltage battery (not illustrated) supplying power to high voltage loads such as a high voltage motor used to drive the vehicle, thereby starting the turning off process. In addition, after the power relays 30-1 to 30-n are turned off, the predetermined time has lapsed so that the charging power of the capacitor or similar device connected to the power line is used and thus the turning off may be completed. Of course, the power relays (some of 30-1 to 30-n) connected to the low voltage battery for operating a load at a relatively low voltage may also be turned off during the ignition off process, if necessary.

According to one exemplary embodiment of the present disclosure, the vehicle controller 10 may use the power latch 11 to maintain the operation even in the state in which the power relays 30-1 to 30-n are turned off. The charging inlet lock device 20 first turns off the power relays 30-1 to 30-n before the standby time for the automatic locking lapses to complete the turning off of the vehicle and then turns off the power relays 30-1 to 30-n again to complete the lock operation of the charging inlet lock device 20.

Figure 2:
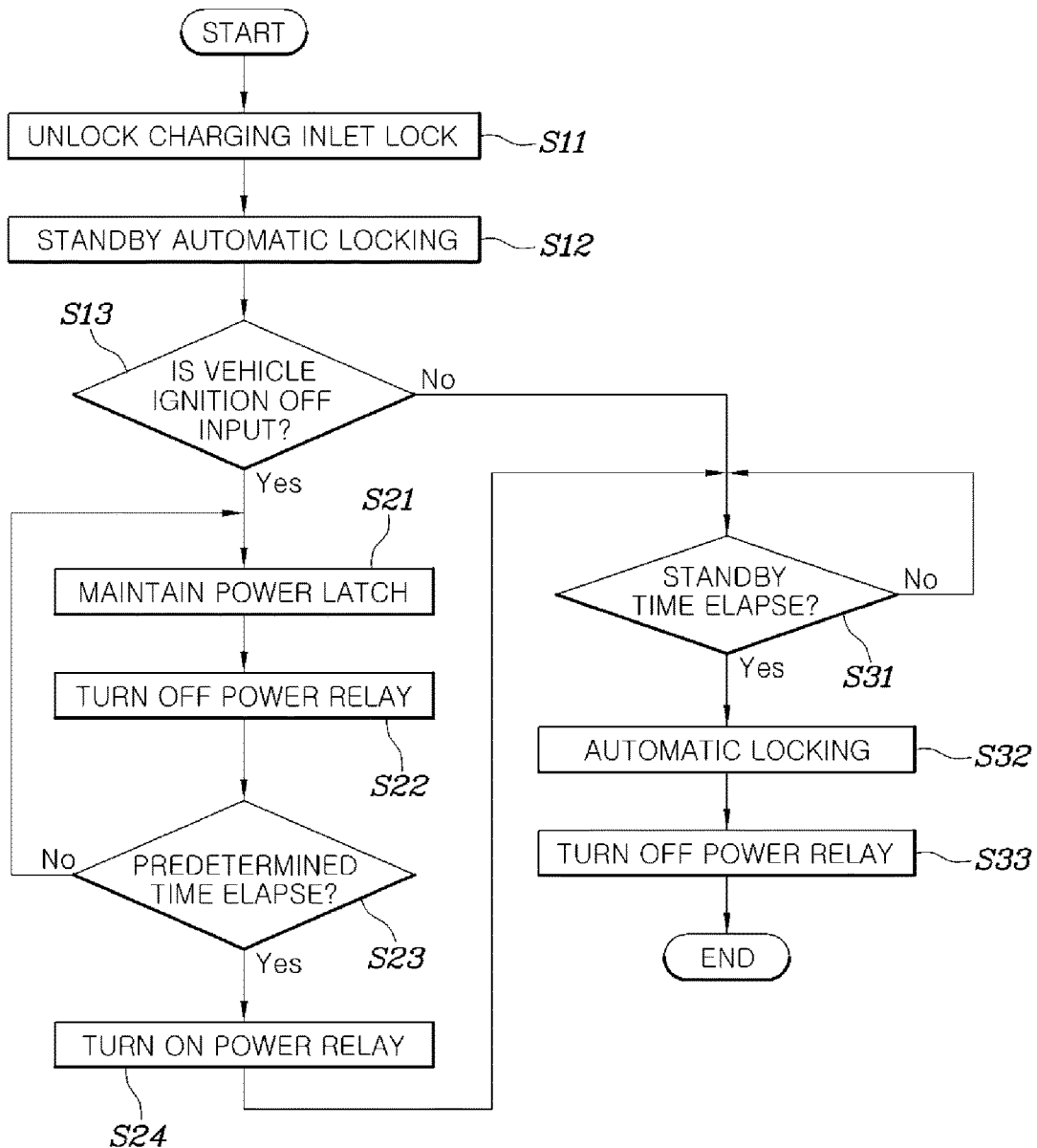
FIG. 2 is a flow chart of a method for controlling a lock of an inlet according to an exemplary embodiment of the present disclosure.

The detailed operation of the inlet lock control device according to one exemplary embodiment of the present disclosure will be more clearly understood from the description of the method for controlling a lock of a charging inlet according to the exemplary embodiment of the present disclosure illustrated in FIG. 2.

FIG. 2 is a flow chart of a method for controlling a lock of a charging inlet according to an exemplary embodiment of the present disclosure.

Referring to FIG. 2, a flowchart depicts the steps of the method for controlling a lock of a charging inlet according to the exemplary embodiment of the present disclosure. The method may be started from step (S12) of waiting for an automatic lock operation if the lock of the charging inlet lock device is not operated (S11).

In FIG. 2, the state in which the lock of the charging inlet lock device is not operated (S11) may be the state in which the charging inlet lock device is unlocked by the user request while the outlet of the external charging facility is newly engaged with the inlet of the vehicle or the outlet is engaged with the inlet.

The step (S12) of waiting for the automatic locking may be a step of determining whether the predetermined standby time has elapsed by allowing the vehicle controller 10 to start the counting immediately after the charging inlet lock device is unlocked by the request of the user immediately after the outlet of the external charging facility is newly engaged with the inlet of the vehicle or while the outlet is engaged with the inlet.

If the vehicle ignition off request is not input (S13) in the step of waiting for the automatic locking (S12), the vehicle controller 10 determines whether the outlet is disengaged while the predetermined standby time elapses (S31). If the standby time elapses when the outlet is not disengaged, the automatic locking starts (S32) and the power relays 30-1 to 30-n may be turned off (S33).

If the request to turn off the starting of the vehicle is input during the standby time for waiting for the automatic locking (S13), the vehicle controller 10 activates and maintains the power latch 11 (S21).

Next, the vehicle controller 10 turns off the power relays 30-1 to 30-n with the power latch 11 being maintained to start the ignition off of the vehicle (S22). The vehicle controller 10 starts the ignition off with the power latch 11 being maintained in step S21 (S22), and therefore may still maintain the activated state while the power relays 30-1 to 30-n are turned off.

Next, the vehicle controller 10 may determine whether or not the set time required to completely turn off the vehicle lapses (S23). If the set time does not lapse, the previous steps (S21 and S22) are maintained until the set time lapses. If the set time lapses, the vehicle controller 10 determines that the vehicle is completely turned off and again turns on the power relay to supply power for driving the charging inlet lock device 20 (S24).

Next, as described above, the vehicle controller 10 may determine whether the operation standby time of the charging inlet lock device 20 elapses (S31). If the standby time elapses, the automatic locking is performed (S32) and then the power relays 30-1 to 30-n of the vehicle may be turned off again.

According to the method and system for controlling a lock of a charging inlet, the power of the controller is continuously maintained by using the power latch of the controller to control the inlet lock function. Thus even when the ignition off input of the vehicle is generated while the lock function of the inlet is performed, after the power relay of the vehicle is turned off immediately to first turn off the starting of the vehicle, the controller, which is powered by the power latch, turns on the relay again to supply power to the inlet lock device, thereby completing the inlet lock function.

According to the method and device for controlling a lock of a charging inlet, even if the input for turning off the vehicle occurs when the inlet lock function is performed, the vehicle is turned off immediately after the ignition off input of the vehicle is generated without delaying the vehicle ignition off until the inlet lock function is completed. Thus, the responsiveness to the input of the driver is improved and the standby time of the driver is eliminated, thereby improving the satisfaction of the driver.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A method for controlling a lock of a charging inlet of a vehicle having a lock device for preventing a charging outlet from being disengaged while the charging outlet is engaged, comprising:
    receiving, by a vehicle controller, a request for turning off the vehicle to the vehicle controller in an operation standby state in which the lock device is set to be operated after a predetermined standby period of time;
    turning off, by the vehicle controller, a power relay of the vehicle while a power latch is maintained to start an process for turning off the vehicle; and
    operating, by the vehicle controller, the lock device by supplying power to the lock device by turning on the power relay if the process of turning off the vehicle is completed.

2. The method of claim 1, wherein the lock device automatically starts the operation when the standby period of time elapses immediately after the charging outlet is engaged or immediately after the lock device is released.

3. The method of claim 1, wherein in the operation of the lock device, the vehicle controller determines whether the standby period of time lapses and operates the lock device if the standby time has lapsed.

4. The method of claim 1, wherein in the operation of the lock device, the vehicle controller selectively turns on the power relay to supply power to the lock device if the process for turning off the vehicle is completed.

5. The method of claim 1, further comprising:
    after the operation of the lock device, the power relay is again turned off by the vehicle controller.

6. A system for controlling a lock of a charging inlet, comprising:
    a charging inlet provided in a vehicle and having a lock device preventing an external charging outlet from being disengaged while the charging outlet is engaged; and
    a vehicle controller receiving information regarding whether the charging outlet is engaged, a request to unlock the lock device, and a request for turning off the vehicle, and controlling an operation of a power relay of the vehicle and an operation of the lock device according to the information and the requests received,
    wherein if the request for turning off the vehicle in an operation standby state in which the lock device is set to be operated after a predetermined standby period of time is received, the vehicle controller turns off the power relay while a power latch is maintained to start a process of turning off the vehicle and then turns on the power relay if the process for turning off the vehicle is completed with a predetermined period of time to supply power to the lock device to operate the lock device.

7. The system of claim 6, wherein the standby period of time is set to automatically start the operation of the lock device when the charging outlet is not disengaged immediately after the charging outlet is engaged or immediately after the lock device is released.

8. The system of claim 6, wherein the vehicle controller determines whether the standby period of time lapses after the process for turning off is completed and the power relay is turned on, and operates the lock device if the standby time lapses.

9. The control system of claim 6, wherein the vehicle controller selectively turns on the power relay to supply power to the lock device if the process for turning off the vehicle is completed.

10. The control system of claim 6, wherein the vehicle controller operates the lock device and then again turns off the power relay.

* * * * *